United States Patent
Raghunath

(10) Patent No.: US 8,392,975 B1
(45) Date of Patent: Mar. 5, 2013

(54) METHOD AND SYSTEM FOR IMAGE-BASED USER AUTHENTICATION

(75) Inventor: Mandayam Thondanur Raghunath, Bangalore (IN)

(73) Assignee: Google Inc., Mountain View, CA (US)

( * ) Notice: Subject to any disclaimer, the term of this patent is extended or adjusted under 35 U.S.C. 154(b) by 698 days.

(21) Appl. No.: 12/163,696

(22) Filed: Jun. 27, 2008

Related U.S. Application Data

(60) Provisional application No. 61/056,904, filed on May 29, 2008.

(51) Int. Cl.
- G06F 7/04 (2006.01)
- G06F 15/16 (2006.01)
- G06F 17/30 (2006.01)
- G06F 12/00 (2006.01)
- G06F 12/14 (2006.01)
- G06F 13/00 (2006.01)
- H04L 29/06 (2006.01)
- G11C 7/00 (2006.01)

(52) U.S. Cl. .............. 726/7; 726/9; 726/19; 726/20

(58) Field of Classification Search ................ 726/7
See application file for complete search history.

(56) References Cited

U.S. PATENT DOCUMENTS

| | | | |
|---|---|---|---|
| 6,252,588 B1 * | 6/2001 | Dawson ................... | 715/752 |
| 6,720,860 B1 * | 4/2004 | Narayanaswami ........ | 340/5.54 |
| 7,337,466 B2 * | 2/2008 | Light et al. ................ | 726/2 |
| 7,350,707 B2 * | 4/2008 | Barkan et al. ............. | 235/454 |
| 2002/0087890 A1 * | 7/2002 | Chan et al. ................ | 713/202 |
| 2002/0138351 A1 * | 9/2002 | Houvener et al. ......... | 705/18 |
| 2002/0170966 A1 * | 11/2002 | Hannigan et al. ........ | 235/462.01 |
| 2002/0188872 A1 * | 12/2002 | Willeby ..................... | 713/202 |
| 2004/0030934 A1 * | 2/2004 | Mizoguchi et al. ........ | 713/202 |
| 2004/0230843 A1 * | 11/2004 | Jansen ....................... | 713/202 |
| 2006/0090073 A1 * | 4/2006 | Steinberg et al. .......... | 713/170 |
| 2006/0200467 A1 * | 9/2006 | Ohmori et al. ............. | 707/9 |
| 2007/0074119 A1 * | 3/2007 | Komine et al. ............ | 715/743 |
| 2007/0083919 A1 * | 4/2007 | Heffez ....................... | 726/5 |
| 2007/0244778 A1 * | 10/2007 | Bailard ...................... | 705/35 |
| 2007/0266428 A1 * | 11/2007 | Downes et al. ............ | 726/5 |
| 2007/0271465 A1 * | 11/2007 | Wu ............................ | 713/183 |
| 2007/0277224 A1 * | 11/2007 | Osborn et al. ............. | 726/2 |
| 2008/0052245 A1 * | 2/2008 | Love .......................... | 705/76 |
| 2008/0077978 A1 * | 3/2008 | Repasi et al. .............. | 726/5 |
| 2008/0222710 A1 * | 9/2008 | Blagsvedt et al. ......... | 726/7 |
| 2008/0230402 A1 * | 9/2008 | Macor ........................ | 206/81 |
| 2008/0244712 A1 * | 10/2008 | Kitada et al. .............. | 726/5 |
| 2009/0165104 A1 * | 6/2009 | Danielsen et al. ......... | 726/6 |
| 2009/0260077 A1 * | 10/2009 | Zhu et al. .................. | 726/19 |
| 2010/0215270 A1 * | 8/2010 | Manohar et al. .......... | 382/177 |
| 2011/0184804 A1 * | 7/2011 | Sontag et al. ............. | 705/14.49 |
| 2012/0291108 A1 * | 11/2012 | Talamo et al. ............. | 726/6 |

FOREIGN PATENT DOCUMENTS

CN    1870497    * 11/2006

* cited by examiner

*Primary Examiner* — Carolyn B Kosowski

(74) *Attorney, Agent, or Firm* — Sterne, Kessler, Goldstein & Fox P.L.L.C.

(57) ABSTRACT

Some embodiments provide a system that authenticates a user. During operation, the system obtains an identifier for the user from an identification card associated with the user and displays a set of images to the user. Next, the system receives an image sequence comprising a sequence of images selected by the user from the set of images. Finally, the system authenticates the user based on the identifier and the image sequence.

15 Claims, 4 Drawing Sheets

METHOD AND SYSTEM FOR IMAGE-BASED USER AUTHENTICATION

RELATED APPLICATION

This application hereby claims priority under 35 U.S.C. §119 to U.S. Provisional Patent Application No. 61/056,904 filed 29 May 2008, entitled "METHOD AND SYSTEM FOR IMAGE-BASED USER AUTHENTICATION," by inventor Mandayam Thondanur Raghunath.

BACKGROUND

1. Field

The present embodiments relate to techniques for authenticating users of a computer system. More specifically, the present embodiments relate to a method and system for image-based authentication of users of a computer system.

2. Related Art

Authentication techniques are commonly used to verify the identities of users of a computer system. After users are successfully authenticated, they may be granted access to data, features, services, and/or other resources provided by the computer system. For example, a user may be required to provide authentication credentials before withdrawing cash from an automated teller machine (ATM), accessing an online banking system, sending and receiving emails, and/or running one or more applications on a local or remote computer.

Authentication is typically performed through interaction between the user and computer system. In particular, the computer system may ascertain the user's identity by requesting one or more authentication factors from the user. These authentication factors may include information that identifies the user, such as a login name or biometric signature. They may also include items possessed by the user, such as an identification card, security token, software token, and/or mobile phone. They may additionally include confidential information which is known by the user, such as a password, pass phrase, and/or personal identification number (PIN). The user is typically authenticated if the combination of authentication factors provided by the user matches records pertaining to the user's identity. For example, the user may be authenticated by an online banking system after correctly providing a login, password, and an answer to a security question to the online banking system.

However, certain users may have difficulty authenticating themselves through a computer system. More specifically, users with limited literacy and/or impaired vision may have trouble understanding requests for authentication factors by computer systems. The same users may also struggle with providing authentication factors that require text-based entry, such as logins, passwords, and/or answers to security questions. Consequently, traditional authentication methods may prevent users with physical and/or mental disabilities from accessing and utilizing the services provided by computer systems.

SUMMARY

Some embodiments provide a system that authenticates a user. During operation, the system obtains an identifier for the user from an identification card associated with the user and then displays a set of images to the user. Next, the system receives an image sequence comprising a sequence of images selected by the user from the set of images. Finally, the system authenticates the user based on the identifier and the image sequence.

In some embodiments, obtaining the identifier for the user involves capturing a visual representation of the identification card and processing the visual representation to obtain the identifier.

In some embodiments, the visual representation is processed using a barcode in the visual representation or optical character recognition (OCR) of the visual representation.

In some embodiments, the visual representation of the identification card is captured using a webcam.

In some embodiments, authenticating the user involves determining a text password for the user from the image sequence and authenticating the user with the identifier and the text password.

In some embodiments, each of the images corresponds to at least one character in a character set. In these embodiments, the text password includes a string of characters corresponding to selected images in the image sequence.

In some embodiments, a user-specific mapping is used to determine the text password from the image sequence.

In some embodiments, the set of images can be provided using a plugin, a web browser extension, or a website.

In some embodiments, the identification card can be associated with an organization, a financial institution, or a government.

DETAILED DESCRIPTION

Figure 1:
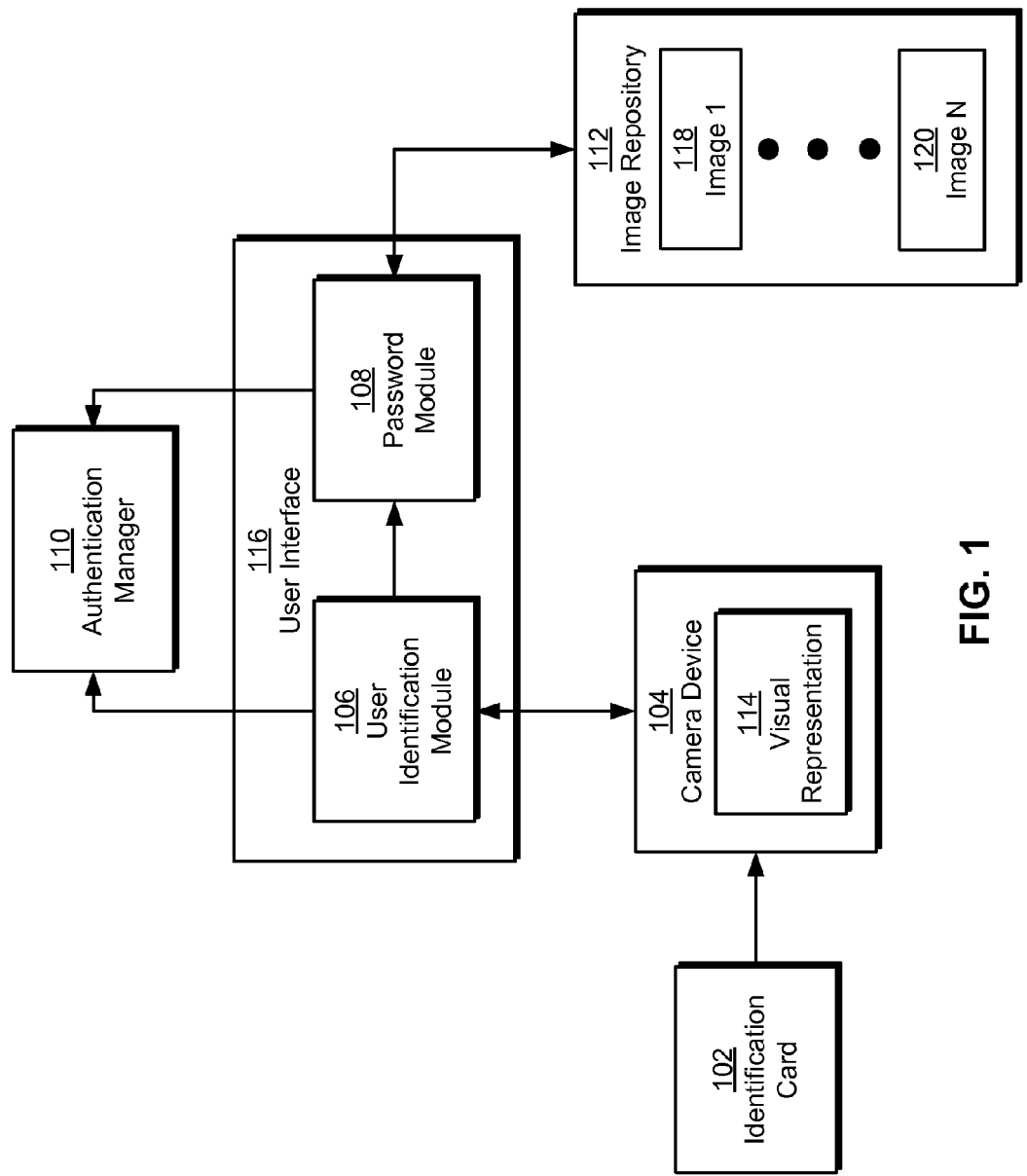
FIG. 1 shows a schematic of a system in accordance with an embodiment.

The following description is presented to enable any person skilled in the art to make and use the embodiments, and is provided in the context of a particular application and its requirements. Various modifications to the disclosed embodiments will be readily apparent to those skilled in the art, and the general principles defined herein may be applied to other embodiments and applications without departing from the spirit and scope of the present embodiments. Thus, the various embodiments are to be accorded the widest scope consistent with the principles and features disclosed herein.

The data structures and code described in this detailed description are typically stored on a computer-readable storage medium, which may be any device or medium that can store code and/or data for use by a computer system. The computer-readable storage medium includes, but is not limited to, volatile memory, non-volatile memory, magnetic and optical storage devices such as disk drives, magnetic tape, CDs (compact discs), DVDs (digital versatile discs or digital video discs), or other media capable of storing computer-readable media now known or later developed.

The methods and processes described in the detailed description section can be embodied as code and/or data, which can be stored in a computer-readable storage medium as described above. When a computer system reads and executes the code and/or data stored on the computer-readable storage medium, the computer system performs the methods and processes embodied as data structures and code and stored within the computer-readable storage medium.

Furthermore, the methods and processes described below can be included in hardware modules. For example, the hardware modules can include, but are not limited to, application-specific integrated circuit (ASIC) chips, field-programmable gate arrays (FPGAs), and other programmable-logic devices now known or later developed. When the hardware modules are activated, the hardware modules perform the methods and processes included within the hardware modules.

Embodiments provide a method and system for authenticating users of a computer system. More specifically, embodiments provide a method and system for image-based authentication of the users. In other words, the users may be authenticated without providing text-based input, thus allowing users with mental and/or physical disabilities, such as users with limited literacy or impaired vision, to authenticate themselves to the computer system.

In one or more embodiments, an identifier for a user is obtained from an identification card associated with the user. The user may then be displayed a set of images from which the user may select an image sequence (i.e., sequence of images) that serves as a password for the user. Furthermore, a text password may be determined from the image sequence using a mapping between the set of images and text characters, such as alphanumeric characters, special characters, and/or characters defined using other character sets. The user may then be authenticated based on the identifier and the image sequence.

FIG. 1 shows a schematic of a system in accordance with an embodiment. As shown in FIG. 1, the system includes a camera device 104, a user interface 116 that includes a user identification module 106 and a password module 108, an image repository 112, and an authentication manager 110. Each of these components is described in further detail below.

In one or more embodiments, the system of FIG. 1 is used to authenticate a user of a computer system (e.g., personal computer, workstation, server, etc.). In other words, the system of FIG. 1 may be used to establish the user's identity prior to granting the user access to one or more features or services provided by the computer system. For example, the system may require the user to be authenticated before accessing an account on an email client, communications system, online banking system, and/or operating system. To authenticate the user, text-based authentication factors, such as an identifier and password may be entered by the user using a keyboard and/or other input device and supplied to the computer system.

However, certain users may have difficulty with text-based entry of authentication factors. In particular, illiterate users and/or users with limited vision may have trouble understanding authentication instructions and/or operating keyboards. To enable access to the computer system by such users, the system of FIG. 1 may allow the users to authenticate themselves using image-based authentication mechanisms. Furthermore, the system of FIG. 1 may be implemented as a web browser extension or plugin that interfaces with a pre-existing text-based authentication system (e.g., a login screen of an online banking system), thus allowing the users to access the services or features guarded by the pre-existing authentication system.

In one or more embodiments, an identifier (e.g., login) for the user is obtained from an identification card 102 associated with the user. Identification card 102 may correspond to a physical identity document issued by a government, financial institution, and/or organization. For example, identification card 102 may be a passport, driver's license, student identification card, credit card, and/or membership card. Identification card 102 may include identifying information associated with the user, such as the user's name, picture, age, birth date, address, and/or an identification number (e.g., driver's license number, passport number, credit card number, etc.). Moreover, the identifying information may be displayed (e.g., printed) on identification card 102 and/or encoded within identification card 102. For example, identification card 102 may include a barcode, security chip, and/or magnetic stripe that encodes some or all of the identifying information associated with the user.

To obtain an identifier for the user, camera device 104 may capture a visual representation 114 of identification card 102. In one or more embodiments, camera device 104 corresponds to a webcam associated with the computer system. To provide camera device 104 with visual representation 114, the user may hold identification card 102 up to a lens of camera device 104. Those skilled in the art will appreciate that other camera devices, such as digital cameras, mobile phone cameras, and/or video cameras may also be used to capture visual representation 114.

In one or more embodiments, user identification module 106 may provide the user with a live view of visual representation 114 as captured by camera device 104 to allow the user to provide a clear and accurate visual representation 114 of identification card 102 to camera device 104. The live view may be displayed within a user interface 116 of the computer system on which the user is authenticated. In addition, user identification module 106 may obtain the user's identifier by processing visual representation 114. Specifically, user identification module 106 may use image processing techniques such as optical character recognition (OCR) to extract identifying information for the user from visual representation 114. User identification module 106 may also use decoding techniques to process a barcode within visual representation 114 to obtain identifying information encoded within the barcode.

Furthermore, identifying information and/or the identifier for the user may be obtained from an integrated circuit and/or magnetic stripe on identification card 102. Instead of processing visual representation 114 of identification card 102, user identification module 106 may obtain the identifier from a device that is able to read information from the integrated circuit and/or magnetic stripe, such as a smart card reader and/or a magnetic stripe reader. In other words, a variety of methods may be used to obtain identifying information for the user from identification card 102. Moreover, the method used may be based on the features of identification card 102 and/or the availability of devices for obtaining information from identification card 102.

Those skilled in the art will appreciate that identifying information provided by identification card 102 may be combined in various ways to obtain an identifier for the user. For example, the user's identifier may be explicitly displayed and/or encoded on identification card 102. Alternatively, the user's identifier may be obtained as a combination of identifying information for the user, such as a concatenation of the user's name and identification number. The identifying information may also be applied to a hash function that generates and/or locates a unique identifier for the user.

Those skilled in the art will also appreciate that identifying information for the user may be obtained through means other than identification card 102. For example, an identifier for the user may be entered on the user's behalf by an administrator, assistant, and/or other user into user identification module 106 using a keyboard, mouse, and/or other input device. Identifying information for the user may also be obtained through biometric sensors, such as fingerprint readers, retinal scanners, and/or a microphone and speaker recognition techniques.

After the user's identifier is obtained through user identification module 106, a password for the user is obtained through password module 108. To obtain the password, password module 108 may retrieve a set of images (e.g., image 1 118, image n 120) from image repository 112 and display the images to the user. The images may correspond to graphical objects (e.g., icons, thumbnails, etc.) that are easily identifiable and/or distinguishable from one another by the user. For example, the images may include graphical representations of animals, objects, places, shapes, and/or other entities that may be recognized and/or remembered by the user.

An image sequence (i.e., a sequence of images) selected from the set of images by the user may then be obtained as a password for the user. For example, the user may use a cursor, touchscreen, stylus, and/or other input device to select images in a specific order to form the image sequence. In addition, the image sequence may be used in lieu of text to obtain a privately known authentication factor from the user. As a result, illiterate users, users with vision difficulties, and/or users who may have difficulty with text-based input devices such as keyboards may authenticate themselves using user identification module 106 and password module 108.

As with the identifier, the password for the user may be obtained from the image sequence in a variety of ways. First, the image sequence itself may serve as a password. In other words, each image in the image sequence may represent a symbol of a password. On the other hand, images from image repository 112 may be mapped to text characters, such as alphabetic characters, numbers, American Standard Code for Information Interchange (ASCII) characters, and/or Unicode characters. Furthermore, the mapping may be one-to-one, one-to-many, many-to-one, or many-to-many. For example, each image may correspond to one or more text characters. On the other hand, multiple images may correspond to a single text character. Finally, as with the identifier, the entire image sequence may be placed through a hash function that generates a unique password value for the user. As a result, a text password may be determined from the image sequence by retrieving the mapping between the images shown to the user and the text characters from which the text password is formed and using the mapping to obtain a string of characters corresponding to the images selected by the user in the image sequence.

Furthermore, a user-specific mapping may be used to determine the text password from the image sequence. More specifically, the mapping between images in image repository 112 and text characters may be based on the user's identifier and/or other identifying information obtained from identification card 102. For example, the identifier and/or other identifying information may be used to generate and/or modify a mapping function that determines the correlation between text characters and images in image repository 112.

The mapping function may additionally determine a subset of images from images in image repository 112 that are shown to the user by password module 108. For example, if image repository 112 contains 500 images and the mapping function produces a one-to-one mapping between images and 50 text characters, 50 images may be selected from the 500 images and mapped to available text characters by the mapping function. These 50 images may then be shown to the user in password module 108 and used to obtain an image sequence from the user. As a result, a higher level of security may be provided by a user-specific mapping between the image sequence selected by the user and the text password used to authenticate the user.

Once the identifier and image sequence are obtained by user identification module 106 and password module 108, respectively, authentication manager 110 may authenticate the user based on the identifier and the image sequence. As described above, the system of FIG. 1 may be implemented as an extension of and/or plugin to a pre-existing authentication system, such as a login mechanism for an online banking system. Moreover, authentication manager 110 may form a part of the pre-existing authentication system and accept only identifiers and passwords that meet certain formatting criteria. For example, authentication manager 110 may require text-based identifiers and passwords of a certain length, as well as a combination of letters and numbers in the text password.

Consequently, the behavior of user identification module 106 and/or password module 108 may be configured to reflect the requirements of authentication manager 110. In particular, the identifier and text password may be generated from identification card 102 and the image sequence such that the identifier and text password conform to requirements for authentication factors set by authentication manager 110. As a result, the user may be registered and subsequently authenticated with authentication manager 110 using a suitable identifier and text password that may be obtained from identification card 102 and the image sequence.

Alternatively, no text password is needed if authentication manager 110 is capable of accepting image sequences as passwords. In other words, if a standalone authentication system (e.g., a login page for a website) is formed using authentication manager 110, user identification module 106, and password module 108, authentication manager 110 may be configured to accept identifiers generated using user identification module 106 and image sequences obtained using password module 108.

Authentication manager 110 may authenticate the user by attempting to match the identifier and password (i.e., image sequence or text password) with an identifier and password combination associated with an authorized user. The user may then be granted access to the features and/or services protected by authentication manager 110 if a match is found.

Figure 2A:
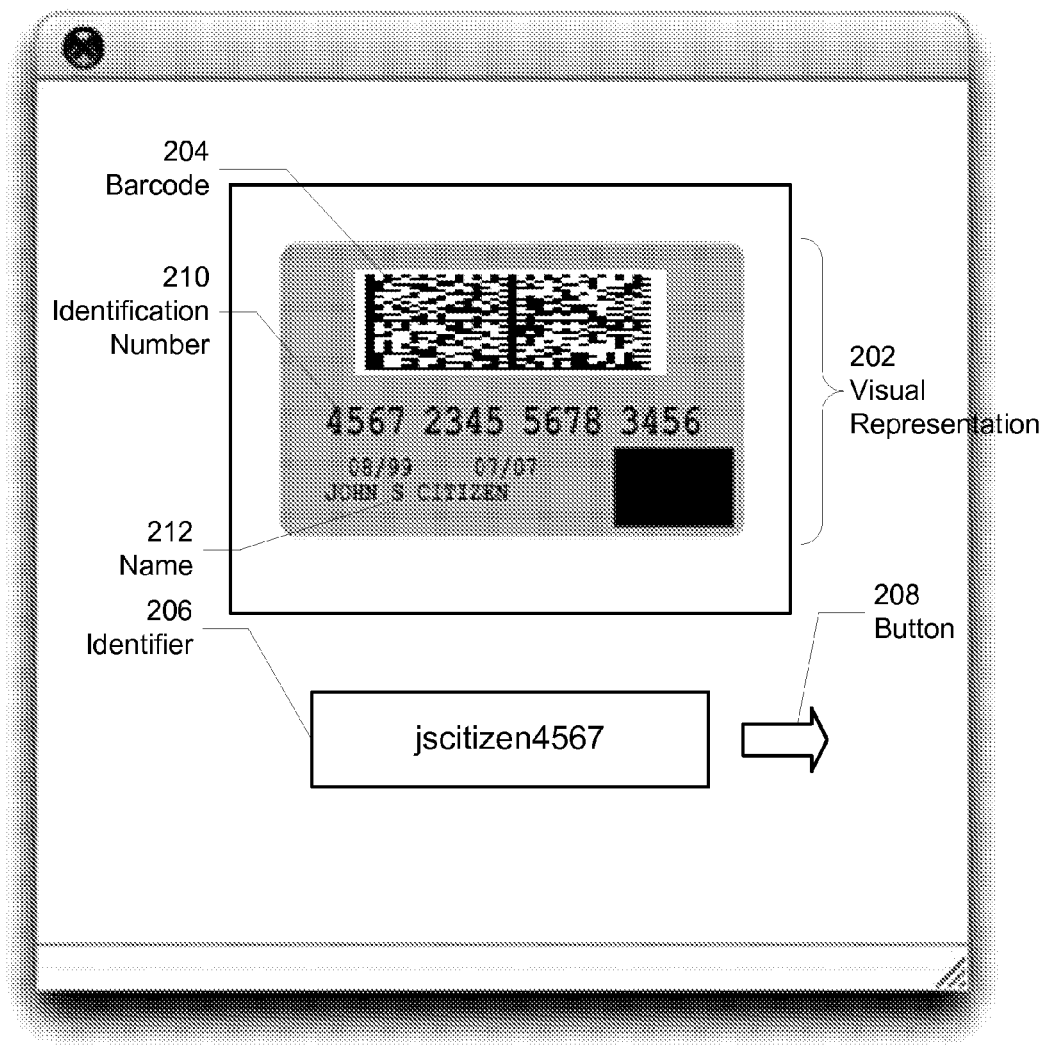
FIG. 2A shows an exemplary screenshot of user identification in accordance with an embodiment.

FIG. 2A shows an exemplary screenshot of user identification in accordance with an embodiment. As described above, an identifier 206 for a user may be obtained from an identification card associated with the user. In addition, a visual representation 202 of the identification card may be captured using a camera device (e.g., a webcam) and processed to obtain identifying information for the user. The user's identifier may then be obtained either directly or indirectly from the identifying information.

As shown in FIG. 2A, visual representation 202 of the identification card includes a barcode 204, an identification number 210, and a name 212. Moreover, one or more image processing techniques may be applied to visual representation 202 to obtain identification number 210, name 212, and/or information encoded in barcode 204. In particular, OCR and barcode recognition mechanisms may be used to extract identifying information from visual representation 202. As discussed above, the identification card may also encode identifying information using devices such as magnetic stripes and embedded integrated circuits. Consequently, specialized readers of the devices may also be used to obtain additional identifying information from the devices.

In one or more embodiments, an identifier for the user is ascertained from identifying information obtained from the identification card. In other words, identifier 206 of "jscitizen4567" may be determined from barcode 204, identification number 210, and/or name 212. For example, barcode 204 may explicitly encode identifier 206. Alternatively, identifier 206 may be constructed from the first two initials and last word of name 212 and the first four digits of identification number 210. Other mappings may also exist between identifying information obtained from visual representation 202 and identifier 206. For example, some or all of the identifying information may be processed using a hash function to generate and/or look up a unique identifier for the user.

Once identifier 206 is obtained from identifying information provided by visual representation 202 and/or other devices on the identification card, a button 208 may be triggered to proceed with authentication using identifier 206. On the other hand, the user may be automatically advanced to the next step of the authentication process once visual representation 202 is clear enough to provide identifying information from which identifier 206 may be obtained. However, no text input is required from the user, regardless of the method in which identifier 206 is obtained and submitted for authentication purposes.

Figure 2B:
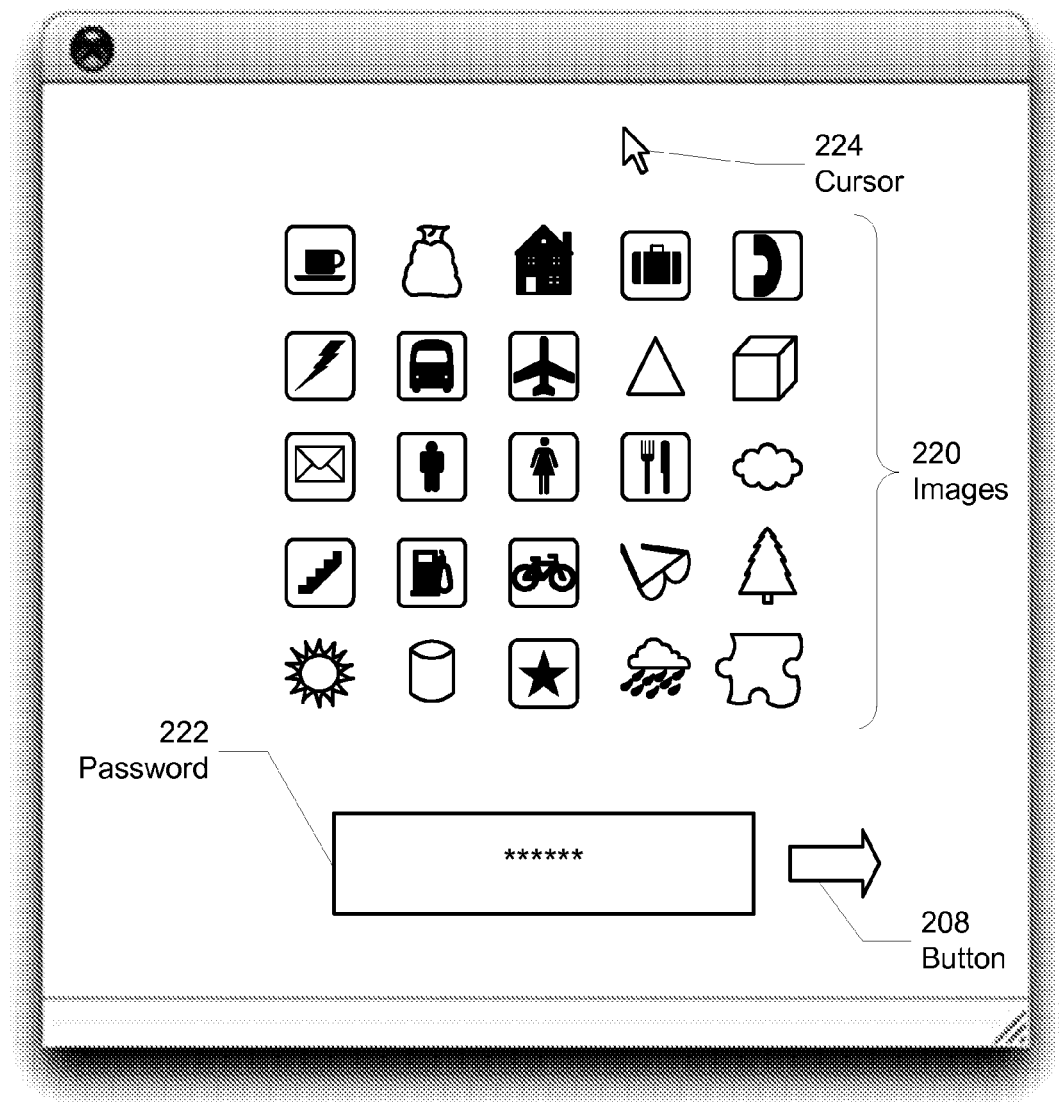
FIG. 2B shows an exemplary screenshot of password entry in accordance with an embodiment.

FIG. 2B shows an exemplary screenshot of password entry in accordance with an embodiment. In particular, FIG. 2B shows an exemplary screenshot of image-based password entry in accordance with an embodiment. As shown in FIG. 2B, a set of 25 images 220 is displayed to the user. Each of the images 220 may correspond to an easily identifiable symbol, object, and/or shape. In addition, the user may select an image sequence from images 220 using a cursor 224. In other words, the user may input the image sequence by clicking on individual images in a specific order from images 220. A password 222 that is used to authenticate the user may then be obtained from the image sequence.

As discussed above, the image sequence may either be used directly as a password or be converted into a text password for authentication. For example, the image sequence may be converted into a text password if the system that authenticates the user only accepts text passwords. To obtain a text password from the image sequence, a mapping between images 220 and a set of text characters may be obtained. The mapping may then be used to obtain a string of characters corresponding to images selected in the image sequence. In addition, the mapping may be based on the user's identifier and/or other user-specific information. As a result, the set of images 220 shown to the user and/or the specific correspondence between images 220 and characters of the text password may be specific to the user. In particular, characters of the user's identifier may be used to generate and/or modify the mapping between images 220 and text characters. For example, the user's identifier may be used to retrieve one or more database entries that specify the images 220 used to authenticate the user, as well as the mapping between each image and one or more text characters.

Once password 222 is obtained from the image sequence, button 208 may be triggered to authenticate the user based on the user's identifier (e.g., identifier 206 of FIG. 2A) and password 222. Alternatively, an attempt to authenticate the user may be automatically triggered once an image sequence of a fixed length (e.g., six images) is entered by the user. As with FIG. 2A, password 222 may be obtained without text-based user input.

Figure 3:
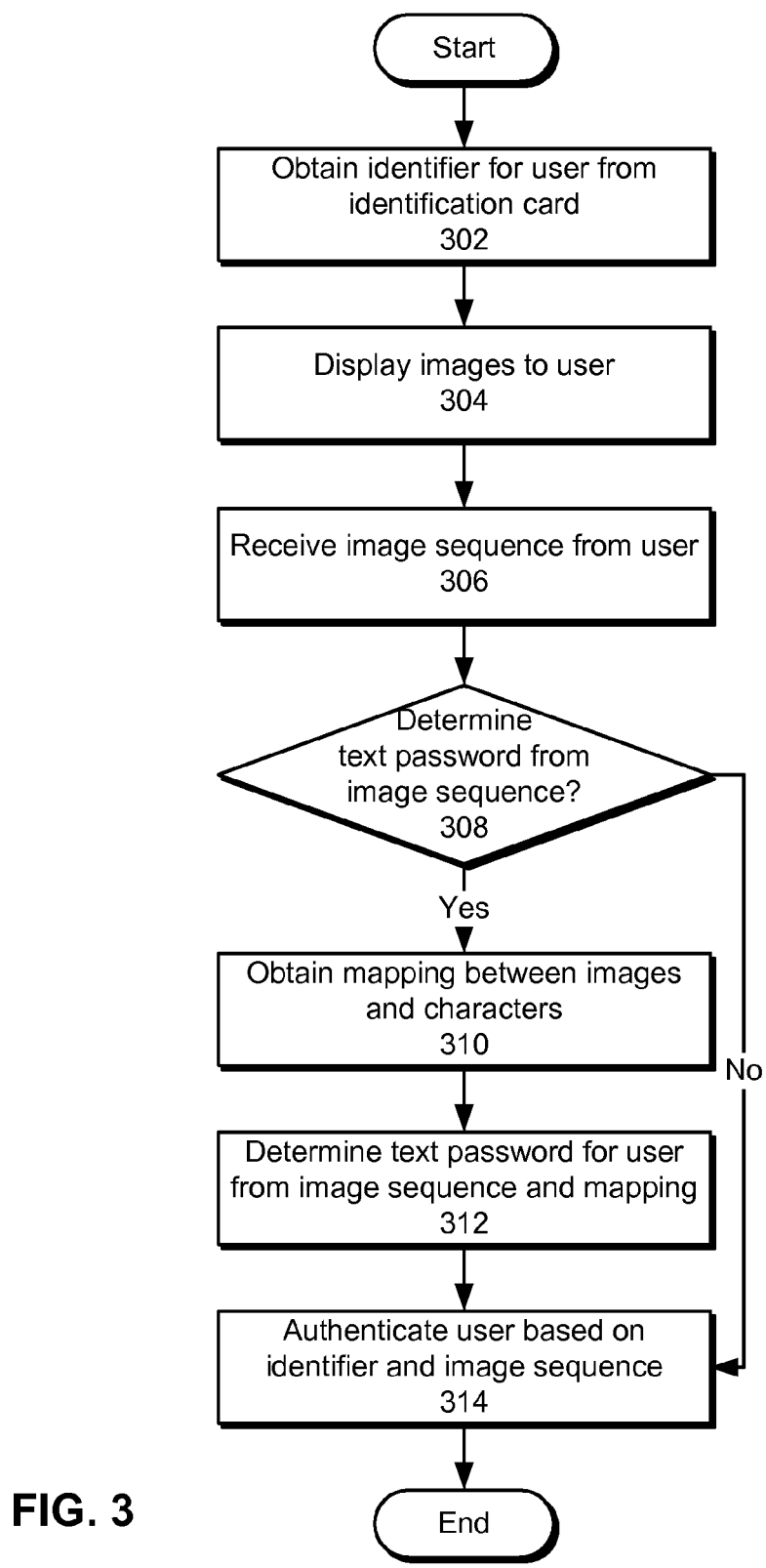
FIG. 3 shows a flowchart illustrating the process of authenticating a user in accordance with an embodiment.

FIG. 3 shows a flowchart illustrating the process of authenticating a user in accordance with an embodiment. In one or more embodiments, one or more of the steps may be omitted, repeated, and/or performed in a different order. Accordingly, the specific arrangement of steps shown in FIG. 3 should not be construed as limiting the scope of the embodiments.

Initially, an identifier for the user is obtained from an identification card associated with the user (operation 302). The identification card may be issued to the user by an organization, government, and/or financial institution. For example, the identification card may be a debit or credit card, driver's license, passport, membership card, student identification card, and/or other physical identity document associated with the user. To obtain the identifier, a visual representation of the identification card may be captured using a camera device such as a webcam and processed using OCR and/or barcode decoding techniques to obtain identifying information for the user. The identifier may be directly stored in the identifying information, or the identifier may be obtained by combining and/or processing some or all of the identifying information.

Next, a set of images is displayed to the user (operation 304). The images may correspond to graphical objects that are easily recognized and/or distinguished from one another by the user. Furthermore, an image sequence selected from the images may be received from the user (operation 306) as a private password. For example, the user may use a cursor and/or touchscreen to select six out of 25 images in a specific order as an image sequence. In addition, the image sequence may contain multiple consecutive or nonconsecutive selections of the same image, just as a word or phrase may include multiple instances of the same text character.

A text password may also be determined from the image sequence (operation 308). In particular, the text password may be used when the image-based authentication mechanism is used as a plugin or extension for a pre-existing text-based authentication mechanism, such as a login window or webpage for an email client, communications system, and/or online banking system. On the other hand, the text password is not used if the image sequence itself may be used as a password.

If a text password is to be determined from the image sequence, a mapping between the images and characters (e.g., alphanumeric characters, ASCII characters, etc.) from which the text password may be formed is obtained (operation 310). Furthermore, the mapping may be user-specific, as described above. The text password may then be determined from the image sequence received from the user and the mapping between the images and characters (operation 312). For example, each image in the image sequence may be translated into one or more text characters using the mapping. The text password may then correspond to the string of characters translated from the image sequence.

The user may then be authenticated based on the identifier and the image sequence (operation 314). If a text password is determined from the image sequence, the user may be authenticated using the identifier and the text password. Alternatively, the image sequence may serve as a password for authenticating the user.

The foregoing descriptions of embodiments have been presented only for purposes of illustration and description. They are not intended to be exhaustive or to limit the embodiments to the forms disclosed. Accordingly, many modifications and variations will be apparent to practitioners skilled in the art. Additionally, the above disclosure is not intended to limit the present embodiments. The scope of the embodiments is defined by the appended claims.

What is claimed is:

1. A method for authenticating a user, comprising in one or more computer systems:

during a user authentication operation, receiving a user identifier input that comprises an identifier for a user;

displaying a set of images to the user;

generating a mapping function that determines a correlation between each image of the set of images and at least one character, wherein the mapping function is generated according to the identifier for the user and is different from a mapping function generated according to a different identifier for another user;

receiving an image sequence comprising a sequence of images selected by the user from the set of images; and authenticating the user based on the identifier and the image sequence.

2. The method of claim 1, wherein receiving a user identifier input further comprises:

capturing a visual representation of an identification card associated with the user, and processing the visual representation to obtain the user identifier.

3. The method of claim 2, wherein the visual representation is processed using at least one of:

a barcode in the visual representation; and optical character recognition (OCR) of the visual representation.

4. The method of claim 2, wherein the visual representation of the identification card is captured using a webcam.

5. The method of claim 2, wherein the identification card is associated with at least one of an organization, a financial institution, and a government.

6. A system for authenticating a user, comprising:

a computer system configured to perform the operations of:

a user identification module configured to, during a user authentication operation, receive a user identifier input that comprises an identifier for a user;

a password module configured to:

display a set of images to the user;

generate, a mapping function that determines a correlation between each image of the set of images and at least one character, wherein the map function is generated according to the identifier for the user and is different from a mapping function generated according to a different identifier for another user; and receive an image sequence comprising a sequence of images selected by the user from the set of images; and an authentication manager configured to authenticate the user based on the identifier and the image sequence.

7. The system of claim 6, wherein the user identification module is further configured to:

obtain a visual representation of an identification card associated with the user, and process the visual representation to obtain the user identifier.

8. The system of claim 7, wherein the visual representation is processed using at least one of a barcode in the visual representation and optical character recognition (OCR) of the visual representation.

9. The system of claim 7, further comprising:

a webcam configured to capture the visual representation of the identification card.

10. The system of claim 7, wherein the identification card is associated with at least one of an organization, a financial institution, and a government.

11. A non-transitory computer-readable storage medium storing instructions that when executed by a computer cause the computer to perform a method for authenticating a user, the method comprising:

during a user authentication operation, receiving a user identifier input that comprises an identifier for a user;

displaying a set of images to the user;

generating a mapping function that determines a correlation between each image of the set of images and at least one character, wherein the mapping function is generated according to the identifier for the user and is different from a mapping function generated according to a different identifier for another user;

receiving an image sequence comprising a sequence of images selected by the user from the set of images; and authenticating the user based on the identifier and the image sequence.

12. The computer-readable storage medium of claim 11, wherein receiving a user identifier input further comprises:

capturing a visual representation of an identification card associated with the user, and processing the visual representation to obtain the user identifier.

13. The computer-readable storage medium of claim 12, wherein the visual representation is processed using at least one of a barcode in the visual representation and optical character recognition (OCR) of the visual representation.

14. The computer-readable storage medium of claim 12, wherein the visual representation of the identification card is captured using a webcam.

15. The computer-readable storage medium of claim 12, wherein the identification card is associated with at least one of an organization, a financial institution, and a government.

\* \* \* \* \*